Nov. 23, 1926.
F. C. BLANCHARD
VALVE HANDLE
Filed August 21, 1922
1,607,604
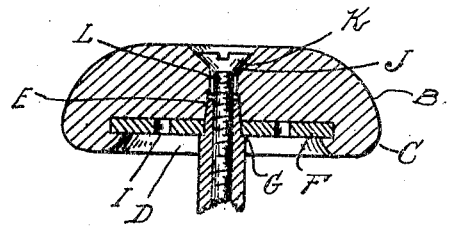
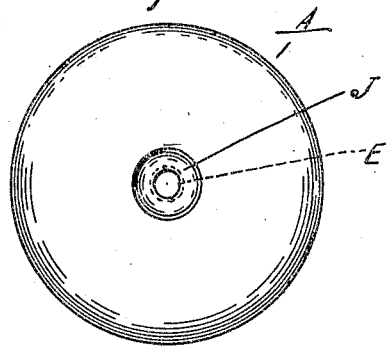
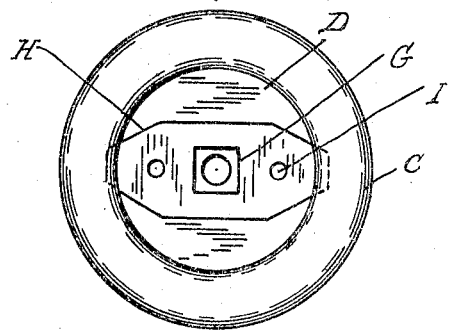
Inventor
Frederick C. Blanchard
By Whittemore Hulbert Whittemore
 & Belknap
Attorneys

UNITED STATES PATENT OFFICE.

FREDERICK C. BLANCHARD, OF DETROIT, MICHIGAN, ASSIGNOR TO DETROIT LUBRICATOR COMPANY, OF DETROIT, MICHIGAN, A CORPORATION OF MICHIGAN.

VALVE HANDLE.

Application filed August 21, 1922. Serial No. 583,416.

The invention relates to handles designed for attachment to rotary stems, such, for instance, as in valve constructions. It is the object of the invention to form a composition handle which is reinforced to take care of torque stresses and also to form a firmer connection with the valve stem. To this end the invention consists in the construction as hereinafter set forth.

In the drawings:

Figure 1 is a vertical central section through the handle as applied to a valve stem;

Figure 2 is a top plan view;

Figure 3 is a bottom plan view.

My improved handle is formed of a composition which may be readily molded into the desired form, but which is lacking in strength when compared to metal. The form adopted is preferably substantially circular in plan view, as indicated at A, and in cross section having a large radius curve B at the top, which extends to near the bottom and there meets a small radius curve C. The bottom is recessed at D and there is provided a central aperture E for receiving the end of the stem.

To form a rigid socket for engaging the stem, a metallic insert F is molded into the handle, this insert being preferably in the form of an oblong bar with a square aperture G at the center thereof. The ends of the bar are preferably tapered, as indicated at H, and extend sufficiently far to underlap the curve C when the lower face of the bar is flush with the bottom of the recess D. The bar is also preferably provided with apertures or recesses I on the opposite side of the squared recess H adapted to receive driver lugs on certain constructions of valves. The central aperture E through the composition is countersunk at J to receive a relatively large tapering head K by a securing screw L. This screw is adapted to engage a threaded aperture in the stem and when tightened, will firmly attach the handle thereto.

With the construction described the torque applied to the handle is first transmitted to the reinforcing plate F through the relatively large peripheral contact therewith and also by reason of the length of said reinforcing bar a strong leverage action is obtained. The central squared aperture G in the reinforcement is adapted to engage with the tapering portion of the stem, so that when the screw L is tightened, all lost motion between the stem and the socket is taken out. Furthermore, the relatively large countersink and large headed screw will apply an end pressure to the composition sufficiently distributed to avoid over-stressing.

The composition of which the handle is formed is one which is low in thermo-conductivity and will therefore never attain the temperature which will burn the hand, but to avoid contact with metallic parts, the insert is fully protected by the depending annular flange of the body and the screw L engages a sufficiently deep countersink in the body, where it will not come in contact with the hand.

What I claim as my invention is:

1. A handle comprising a molded composition body centrally recessed on its under side forming a depending surrounding annular flange, a metallic insert molded into interlocking engagement with said body, said insert having its opposite ends underlapping said annular flange and having its lower surface spaced above the lower portion of said body, said insert being also provided with an aperture for engaging the stem.

2. A handle comprising a metallic insert having a polygonal central aperture for engaging the stem, and a composition body molded about said insert to contact with the upper face and end portions thereof, said body being provided with a depending annular marginal portion extending below the lower face of said insert.

3. A handle comprising a metallic insert having a central aperture for engaging the stem, and a composition body molded about said insert to contact with the upper face and end portions thereof, said body being provided with a depending annular portion extending below the lower face of said insert, and said body having a substantially flat upper surface provided with a central conical recess.

4. The combination with a valve stem having a tapering end of polygonal cross section, of a flat metallic strip of elongated form provided with tapering end portions lying in the same plane, and a composition body molded about said flat strip to contact with the upper face and the tapering end portions thereof, said body being provided with an annular lower marginal portion extending below the lower face of said metallic strip, said body having an aperture therethrough provided with a conical countersunk portion, said insert having a central polygonal aperture engaging said stem, and a screw secured to said stem and provided with a tapering head engaging the conical sides of said countersunk portion.

In testimony whereof I affix my signature.

FREDERICK C. BLANCHARD.